(12) United States Patent
Majumdar et al.

(10) Patent No.: US 10,081,221 B2
(45) Date of Patent: Sep. 25, 2018

(54) BALANCE PADS FOR BALANCING PNEUMATIC TIRES

(75) Inventors: Ramendra Nath Majumdar, Hudson, OH (US); Leonard James Reiter, Norton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/953,909

(22) Filed: Nov. 24, 2010

(65) Prior Publication Data

US 2012/0125498 A1    May 24, 2012

(51) Int. Cl.
*F16F 15/32* (2006.01)
*B60C 19/00* (2006.01)
*B60C 1/00* (2006.01)

(52) U.S. Cl.
CPC ............... *B60C 19/00* (2013.01); *B60C 1/00* (2013.01); *B60C 19/003* (2013.01); *B60C 1/0008* (2013.01)

(58) Field of Classification Search
CPC ........... B60C 5/00; B60C 19/00; B60C 19/12; B60C 5/142; B60C 2005/145; B60C 17/0036; B60C 17/009; B60C 19/002; B60C 19/003; B60C 1/0008; B60C 23/0491; B60C 23/0493; B60C 19/125; B60C 19/122; B29D 2030/0072; B29D 2030/0077; B29D 2030/0083
USPC ......... 152/548, 450, 154.1, 154.2, 155, 158, 152/565, 152.1, 367, 152; 156/75, 64, 156/123, 110.1
See application file for complete search history.

(56) References Cited

U.S. PATENT DOCUMENTS 2,080,227 A * 5/1937 Periat et al. ................. 301/5.21
2,905,582 A * 9/1959 Coleman, Jr. ................. 156/310
(Continued)

FOREIGN PATENT DOCUMENTS

CN        1721174 A      1/2006
CN      101304873 A     11/2008
(Continued)

OTHER PUBLICATIONS

Anonymous, ExxonMobil introduces inner liner revolution—new facility, European Rubber Journal, Jul./Aug. 2007, p. 14, vol. 189, No. 4.
(Continued)

*Primary Examiner* — Robert C Dye
*Assistant Examiner* — Kendra Ly
(74) *Attorney, Agent, or Firm* — Wood Herron & Evans LLP

(57) ABSTRACT

Balance pads for balancing pneumatic tires having DVA innerliners, and methods for balancing such pneumatic tires, are disclosed. In one embodiment, a balance pad is provided for balancing a pneumatic tire having a DVA innerliner. The balance pad includes an outer layer having a dynamically vulcanized alloy, which comprises an engineering resin as a continuous phase and at least a partially vulcanized rubber as a dispersed phase. The balance pad further includes an inner layer having a rubber or plastic compound that is bonded to the outer layer. The outer layer is capable of being bonded to an inner surface of a tire innerliner, which includes a dynamically vulcanized alloy having an engineering resin as a continuous phase and at least a partially vulcanized rubber as a dispersed phase.

13 Claims, 2 Drawing Sheets

(56) References Cited

U.S. PATENT DOCUMENTS

| | | | |
|---|---|---|---|
| 5,049,618 A | | 9/1991 | Wideman et al. |
| 5,938,869 A | * | 8/1999 | Kaido et al. ............... 152/510 |
| 6,579,389 B1 | * | 6/2003 | Kobayashi .................. 156/64 |
| 6,884,832 B2 | | 4/2005 | Wentworth et al. |
| 6,969,737 B2 | | 11/2005 | Wentworth et al. |
| 7,432,337 B2 | | 10/2008 | Miyazaki |
| 2002/0124921 A1 | * | 9/2002 | Nakajima et al. ......... 152/154.1 |
| 2003/0150544 A1 | * | 8/2003 | Naito et al. ................. 156/115 |
| 2005/0205183 A1 | * | 9/2005 | Yukawa ..................... 152/450 |
| 2005/0217777 A1 | * | 10/2005 | Yukawa .................. B60B 3/04 152/450 |
| 2006/0005912 A1 | * | 1/2006 | Weydert et al. ........... 156/110.1 |
| 2007/0119533 A1 | * | 5/2007 | Yukawa ..................... 152/450 |
| 2008/0047646 A1 | * | 2/2008 | Hong et al. ................. 152/510 |
| 2008/0314491 A1 | | 12/2008 | Soeda et al. |
| 2008/0314492 A1 | | 12/2008 | Tsou et al. |
| 2009/0015184 A1 | | 1/2009 | Knierim |
| 2009/0218024 A1 | | 9/2009 | Tsou et al. |
| 2009/0308519 A1 | * | 12/2009 | Ishihara ..................... 152/548 |
| 2009/0314402 A1 | * | 12/2009 | Kuramori et al. ........... 152/155 |
| 2009/0314403 A1 | * | 12/2009 | Tanno ......................... 152/157 |
| 2012/0015182 A1 | * | 1/2012 | Caraway et al. ............ 428/354 |

FOREIGN PATENT DOCUMENTS

| | | | | |
|---|---|---|---|---|
| CN | 101607510 A | | 12/2009 | |
| CN | 101607513 A | | 12/2009 | |
| JP | 58152612 A | * | 9/1983 | ............ B60C 19/00 |
| JP | 2002-195907 A | | 7/2002 | |
| JP | 2009-528178 A | | 8/2009 | |
| JP | 2009-234391 A | | 10/2009 | |
| JP | 2010-000947 A | | 1/2010 | |

OTHER PUBLICATIONS

Anonymous, US: ExxonMobil to constuct new facility in Florida for tyre compounds, Jun. 20, 2007, 2 pages, AutomotiveWorld.com.
Tracey, Donald S. et al., Dynamically vulcanized alloy innerliners, Rubber World, Sep. 2007, pp. 17-21.
Anonymous, ExxonMobil Facility to Produce Compounds for Tires, Plastics Engineering, Sep. 2007, p. 20, vol. 63, No. 9.
European Search Report issued in European Patent Application No. 11190217.7, dated Mar. 14, 2012, 4 pages.
Chinese Patent Office, Office Action issued in Application No. 201110377982.2, dated Jan. 6, 2014, 20 pp.
Japanese Patent Office, Notice of Reasons for Rejection issued in corresponding Japanese Patent Application No. 2011-256554 and English-language translation, dated Oct. 21, 2015.

* cited by examiner

BALANCE PADS FOR BALANCING PNEUMATIC TIRES

TECHNICAL FIELD

The present invention is directed to balance pads for balancing pneumatic tires with DVA innerliners.

BACKGROUND

Pneumatic tires are commonly used on a variety of vehicles, such as passenger automobiles, aircraft, and industrial machinery. It is well known that even a small amount of imbalance in a pneumatic tire mounted to a vehicle can cause undesirable vibration and noise when the tire is rotating at the operating speeds of the vehicle. This imbalance may be attributed to non-uniformities or imperfections in the tire wheel rim, or to imperfections or non-uniformities in the molded tire itself. Such imbalance is particularly noticeable on tires used on aircraft nose landing gear, due to the high wheel speeds, or high revolutions per minute, attained during take-off of the aircraft.

One approach to eliminating or reducing the effects of imbalance in formed tires has been to secure discrete patches of rubber material to the tire innerliner, after the tire has been cured, in an effort to offset any imbalances. Conventional two layered rubber patches or balance pads, which include a thin "adhesive rubber layer" and a thicker "high gravity compound layer", are commonly used for balancing tires, such as aircraft tires. There also may be one or more other layers placed in-between the two layers to bond them together.

The approach to balancing tires using balance pads requires determining the amount and location of imbalance of the formed tire, typically in a dynamic testing machine. Based upon the results of the imbalance testing, a determination is made as to the location and mass of the patch material needed to counteract the imbalance of the tire. The inner surface of the tire is thereafter cleaned at the appropriate location, typically using an organic solvent, and the patch is adhered at the desired location using one or more solvent-based adhesives, typically rubber-based fast dry cement. Rubber patches commonly used for balancing tires are generally provided in fixed weight increments. One issue of particular importance with tire balancing is obtaining desirable adhesion between balance pads and tire innerliners, particularly with respect to tire innerliners that now utilize dynamically vulcanized alloys.

Dynamically vulcanized alloys ("DVAs"), and in particular DVA films, have been touted as an improved replacement for halobutyl innerliners in tires, at least in part because the films are thinner and lighter than conventional halobutyl innerliners. Yet, in order to have desirable adhesion between conventional balance pads and DVA innerliners, attachment therebetween needs to be addressed. In particular, the DVA is a non-stick material with no inherent tack and includes, in part, an engineering resin, e.g., nylon, as a continuous phase that, unlike conventional halobutyl innerliners, creates a mismatch between the rubber inner rubber layer of conventional balance pads. The end result is that conventional balance pads, which include the rubber based adhesive layers, do not adhere satisfactorily to the DVA innerliner using conventional rubber based fast dry cements.

Accordingly, there is a need in the art for a balance pad for balancing pneumatic tires, which include DVA innerliners, which overcomes the aforementioned drawbacks and disadvantages.

SUMMARY

The present invention is directed to balance pads for balancing pneumatic tires having DVA innerliners, and methods for balancing such pneumatic tires.

In one embodiment, a balance pad is provided for balancing a pneumatic tire having a DVA innerliner. The balance pad includes an outer layer having a dynamically vulcanized alloy, which comprises an engineering resin as a continuous phase and at least a partially vulcanized rubber as a dispersed phase. The balance pad further includes an inner layer having a rubber or plastic compound that is bonded to the outer layer. The outer layer is capable of being bonded to an inner surface of a tire innerliner, which includes a dynamically vulcanized alloy having an engineering resin as a continuous phase and at least a partially vulcanized rubber as a dispersed phase.

In another embodiment, a pneumatic tire is provided that includes an outer tread and an innerliner disposed inwardly of the outer tread. The innerliner includes a dynamically vulcanized alloy, which has an engineering resin as a continuous phase and at least a partially vulcanized rubber as a dispersed phase. The innerliner also includes an inner surface and an outer surface. The pneumatic tire further includes a balance pad having an outer layer and an inner layer. The outer layer includes a dynamically vulcanized alloy, which has an engineering resin as a continuous phase and at least a partially vulcanized rubber as a dispersed phase. The inner layer includes a rubber or plastic compound that is bonded to the outer layer. The outer layer of the balance pad is bonded to the inner surface of the innerliner.

In another embodiment, a method of balancing a pneumatic tire is provided that includes bonding an outer layer of at least one balance pad to an inner surface of an innerliner of a tire. The innerliner is disposed inwardly of an outer tread and includes a dynamically vulcanized alloy, which comprises an engineering resin as a continuous phase and at least a partially vulcanized rubber as a dispersed phase. The outer layer of the balance pad includes a dynamically vulcanized alloy, which comprises an engineering resin as a continuous phase and at least a partially vulcanized rubber as a dispersed phase. The balance pad further includes an inner layer having a rubber or plastic compound that is bonded to the outer layer.

BRIEF DESCRIPTION OF THE DRAWINGS

The accompanying drawings, which are incorporated in and constitute a part of this specification, illustrate embodiments of the invention and, together with the general description of the invention given above, and detailed description given below, serve to explain the invention.

DETAILED DESCRIPTION

Figure 1:
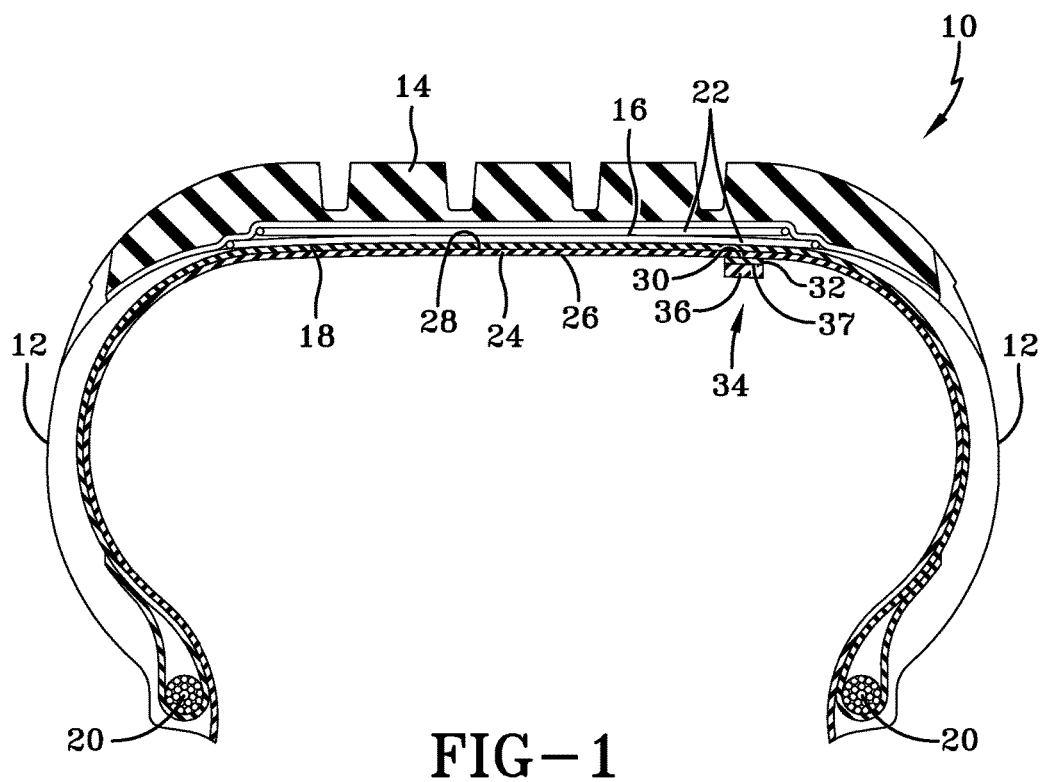
FIG. 1 is a cross-sectional view of a pneumatic tire with DVA innerliner and balance pad adhered thereto in accordance with an embodiment of the present invention.

FIG. 1 shows a pneumatic tire 10 that includes sidewalls 12, an outer circumferential rubber tread 14, a supporting carcass 16, which includes a ply layer 18 and inextensible beads 20, belts 22, and an innerliner 24, which includes an inner surface 26 and an outer surface 28. The innerliner 24 is designed to inhibit the passage of air or oxygen therethrough so as to maintain tire pressure over extended periods of time. The individual sidewalls 12 extend radially inward from the axial outer edges of the tread 14 to join the respective inextensible beads 20. The supporting carcass 16 acts as a supporting structure for the tread portion 14 and sidewalls 12. And the outer circumferential tread 14 is adapted to be ground contacting when the tire 10 is in use.

Figure 2:
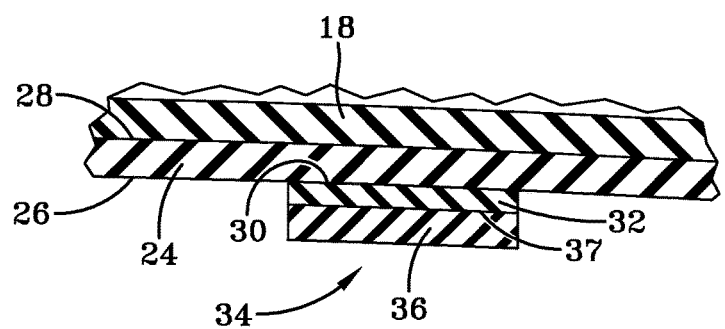
FIG. 2 is an enlarged cross-sectional view of the balance pad of FIG. 1.

With further reference to FIGS. 1 and 2, the inner surface 26 of the innerliner 24 is bonded to an outer surface 30 of an outer layer 32 of a balance pad 34. The remainder of the balance pad 34 includes an inner layer 36 that is bonded to an inner surface 37 of the outer layer 32. While the balance pad 34 is shown as defining a two-layered structure, it should be understood that the balance pad 34 can include more than two layers.

The innerliner 24 and the outer layer 32 of the balance pad 34 include a dynamically vulcanized alloy ("OVA"), which may be the same or different. The DVA material includes at least one engineering resin as a continuous phase and at least one partially vulcanized rubber as a dispersed phase, and can be prepared by generally blending together the engineering resin and rubber, with curatives and fillers, utilizing technology known as dynamic vulcanization.

The term "dynamic vulcanization" denotes a vulcanization process in which the engineering resin and the rubber are mixed under conditions of high shear and elevated temperature in the presence of a curing agent. The dynamic vulcanization is affected by mixing the ingredients at a temperature which is at or above the curing temperature of the rubber using equipment such as roll mills, Banbury mixers, continuous mixers, kneaders, mixing extruders (such as twin screw extruders), or the like. As a result, the rubber is simultaneously crosslinked and dispersed as fine particles, for example, in the form of a microgel, within the engineering resin, which forms a continuous matrix. One characteristic of the dynamically cured composition is that, notwithstanding the fact that the rubber is cured (or at least partially cured), the composition can be processed and reprocessed by conventional thermoplastic processing techniques such as extrusion, injection molding, compression molding, etc.

The engineering resin (also called an "engineering thermoplastic resin," a "thermoplastic resin," or a "thermoplastic engineering resin") can include any thermoplastic polymer, copolymer or mixture thereof including, but not limited to, one or more of the following: a) polyamide resins, such as nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon MXD6 (MXD6), nylon 6T (N6T), nylon 6/6T copolymer, nylon 66/PP copolymer, or nylon 66/PPS copolymer; b) polyester resins, such as polybutylene terephthalate (PBT), polyethylene terephthalate (PET), polyethylene isophthalate (PEI), PET/PEI copolymer, polyacrylate (PAR), polybutylene naphthalate (PBN), liquid crystal polyester, polyoxalkylene diimide diacid/polybutyrate terephthalate copolymer and other aromatic polyesters; c) polynitrile resins, such as polyacrylonitrile (PAN), polymethacrylonitrile, acrylonitrile-styrene copolymers (AS), methacrylonitrile-styrene copolymers, or methacrylonitrile-styrene-butadiene copolymers; d) polymethacrylate resin, such as polymethyl methacrylate, or polyethylacrylate; e) polyvinyl resins, such as vinyl acetate (EVA), polyvinyl alcohol (PVA), vinyl alcohol/ethylene copolymer (EVOA), polyvinylidene chloride (PVDC), polyvinyl chloride (PVC), polyvinyl/polyvinylidene copolymer, or polyvinylidene chloride/methacrylate copolymer; f) cellulose resins, such as cellulose acetate, or cellulose acetate butyrate; g) fluorine resins, such as polyvinylidene fluoride (PVDF), polyvinyl fluoride (PVF), polychlorofluoroethylene (PCTFE), or tetrafluoroethylene/ethylene copolymer (ETFE); h) polyimide resins, such as aromatic polyimides; i) polysulfones; j) polyacetals; k) polylactones; l) polyphenylene oxide and polyphenylene sulfide; m) styrene-maleic anhydride; n) aromatic polyketones; and o) mixtures of any and all of a) through n) inclusive as well as mixtures of any of the illustrative or exemplified engineering resins within each of a) through n) inclusive.

In one embodiment, the engineering resin includes polyamide resins and mixtures thereof, such as Nylon 6, Nylon 66, Nylon 6 66 copolymer, Nylon 11, and Nylon 12, and their blends. In another embodiment, the engineering resin excludes polymers of olefins, such as polyethylene and polypropylene. In another embodiment, the engineering resin has a Young's modulus of more than 500 MPa and/or an air permeation coefficient of less than $60\times10^{-12}$ cc·cm/cm² sec cm Hg (at 30° C.). In one example, the air permeation coefficient is less than $25\times10^{-12}$ cc·cm/cm² sec cm Hg (at 30° C.).

The rubber component of the DVA can include diene rubbers and hydrogenates thereof, halogen containing rubbers, such as halogenated isobutylene containing copolymers (e.g., brominated isobutylene p-methylstyrene copolymer), silicone rubbers, sulfur-containing rubbers, fluoro rubbers, hydrin rubbers, acryl rubbers, ionomers, thermoplastic elastomers, or combinations and blends thereof.

In one embodiment, the rubber component is a halogen containing rubber. The halogen containing rubber, or halogenated rubber, can include a rubber having at least about 0.1 mole % halogen (e.g., bromine, chlorine or iodine). Suitable halogenated rubbers include halogenated isobutylene containing rubbers (also referred to as halogenated isobutylene-based homopolymers or copolymers). These rubbers can be described as random copolymers of a $C_4$ to $C_7$ isomonoolefin derived unit, such as isobutylene derived unit, and at least one other polymerizable unit. In one example, the halogenated isobutylene-containing rubber is a butyl-type rubber or branched butyl-type rubber, such as brominated versions. Useful unsaturated butyl rubbers such as homopolymers and copolymers of olefins or isoolefins and other types of rubbers suitable for the disclosure are well known and are described in RUBBER TECHNOLOGY 209-581 (Maurice Morton ed., Chapman & Hall 1995), THE VANDERBILT RUBBER HANDBOOK 105-122 (Robert F. Ohm ed., R.T. Vanderbilt Co., Inc. 1990), and Edward Kresge and H. C. Wang in 8 KIRK-OTHMER ENCYCLOPEDIA OF CHEMICAL TECHNOLOGY 934-955 (John Wiley & Sons, Inc. 4th ed. 1993). In one example, the halogen containing rubber is a halogenated isobutylene-p-methylstyrene-isoprene copolymer or a halogenated poly (isobutylene-co-p-methylstyrene) polymer, which is a brominated polymer that generally contains from about 0.1 to about 5 wt % of bromomethyl groups.

In one embodiment, the rubber has a Young's modulus of more than 500 MPa and/or an air permeation coefficient of less than $60\times10^{-12}$ cc·cm/cm² sec cm Hg (at 30° C.). In one example, the air permeation coefficient is less than $25\times10^{-12}$ cc·cm/cm² sec cm Hg (at 30° C.).

In one embodiment, both the rubber component and engineering resin are present in an amount of at least 10% by weight, based on the total weight of the rubber formulation; and the total amount of the rubber component and engineering resin is not less than 30% by weight, based on the total weight of the rubber formulation.

As earlier indicated, the DVA can also include one or more filler components, which can include calcium carbonate, clay, mica, silica and silicates, talc, titanium dioxide, starch and other organic fillers such as wood flour, and carbon black. In one example, the filler is present from about 20% to about 50% by weight of the total DVA composition.

Additional additives known in the art may also be provided in the DVA to provide a desired compound having desired physical properties. Such known and commonly used additive materials are activators, retarders and accelerators, rubber processing oils, resins including tackifying resins, plasticizers, fatty acids, zinc oxide, waxes, antidegradant, antiozonants, and peptizing agents. As known to those having ordinary skill in the art, depending on the intended use of the DVA, the additives are selected and used in conventional amounts.

Suitable DVAs as well as methods for making DVAs in accordance with embodiments of the present invention are disclosed in U.S. Patent Application Publication Nos. 2008/0314491; 2008/0314492; and 2009/015184, the contents of which are expressly incorporated by reference herein in their entireties.

Specifically with respect to the dynamic vulcanization process itself, the process involves substantially simultaneously mixing and vulcanizing, or crosslinking, at least the one vulcanizable rubber component in a composition that further includes at least the one engineering resin, which is not vulcanizable, using a vulcanizing or curing agent(s) for the vulcanizable component. Suitable curing agents or curatives for the dynamic vulcanization process include, for example, ZnO, CaO, MgO, $Al_2O_3$, $CrO_3$, FeO, $Fe_2O_3$, and NiO, which can be used in conjunction with a corresponding metal stearate complex (e.g., the stearate salts of Zn, Ca, Mg, and Al), or with stearic acid, and either a sulfur compound or an alkylperoxide compound. Accelerators may be optionally added. Peroxide curatives are to be avoided when the engineering resin(s) chosen are such that peroxide would cause these resins themselves to crosslink, thereby resulting in an excessively cured, non-thermoplastic composition.

The dynamic vulcanization process is conducted at conditions to at least partially vulcanize the rubber component. To accomplish this, the engineering resin, the rubber component and other optional polymers, as well as the cure system, can be mixed together at a temperature sufficient to soften the resin. The mixing process can be continued until the desired level of vulcanization or crosslinking is completed. In one embodiment, the rubber component can be dynamically vulcanized in the presence of a portion or all of the engineering resin. Similarly, it is not necessary to add all of the fillers and oil, when used, prior to the dynamic vulcanization stage. Certain ingredients, such as stabilizers and process aids can function more effectively if they are added after curing. Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is typically from about the melting point of the thermoplastic resin to about 300° C., for example.

The resulting DVA is ready to be used as the innerliner 24 as well as the outer layer 32 of the balance pad 34. The innerliner 24 and outer layer 32 can be prepared by calendering the DVA material into a sheet or film material having a thickness of about 0.1 mm to about 1 mm. The sheet material can be cut into strips of appropriate width and length for application with a particular size or type tire 10 or particular size or type of balance pad 34. The innerliner 24 may also be provided as a tubular layer. One suitable type of DVA film for use as the innerliner 24 or balance pad 34 is Exxcore™ DVA, which is available from ExxonMobil of Houston, Tex.

The inner layer 36 of the balance pad 34 can include a rubber compound or a plastic compound. The rubber compound for the inner layer 36 can include any curable rubber compound, such as those rubber compounds known to be used in high gravity compound layers of conventional balance pads, provided that the selected rubber compound desirably bonds to the DVA, such as when subjected to conventional curing processes. In one example, the rubber compound can include 100 parts of natural rubber, a synthetic rubber, or blends or combinations thereof. Such rubber compound can further include 1-10 phr of a melamine and at least one reinforcing filler, as well as other optional components discussed further below.

The natural or synthetic rubber component of the rubber compound for the inner layer 36 can be a conventional diene or high diene rubber, which may include at least 50 mole % of a $C_4$ to $C_{12}$ diene monomer and, in another example, at least about 60 mole % to about 100 mole %. Useful diene rubbers include homopolymers and copolymers of olefins or isoolefins and multiolefins, or homopolymers of multiolefins, which are well known and described in RUBBER TECHNOLOGY, 179-374 (Maurice Morton ed., Chapman & Hall 1995), and THE VANDERBILT RUBBER HANDBOOK 22-80 (Robert F. Ohm ed., R.T. Vanderbilt Co., Inc. 1990). Suitable examples of diene rubbers include polyisoprene, polybutadiene rubber, styrene-butadiene rubber, natural rubber, chloroprene rubber, acrylonitrile-butadiene rubber, and the like, which may be used alone or in combination and mixtures. In another example, the diene rubber can include styrenic block copolymers, such as those having styrene contents of 5 wt % to 95 wt %. Suitable styrenic block copolymers (SBC's) include those that generally comprise a thermoplastic block portion A and an elastomeric block portion B.

The melamine derivative in the rubber compound can include, for example, hexamethoxymethylmelamine (HMMM), tetramethoxymethyl-melamine, pentamethoxymethylmelamine, hexaethoxymethylmelamine, and dimers thereof; N-(substituted oxymethyl)melamine derivatives such as hexakis(methoxymethyl)melamine, N,N',N"-trimethyl-N,N',N"-trimethylolmelamine, hexamethylolmelamine, N,N',N"-trimethylolmelamine, N-methylolmelamine, N,N'-dimethylolmelamine, N,N',N"-triethyl-N,N',N"-tris(methoxymethyl)melamine, and N,N',N"-tributyl-N,N',N"-trimethylolmelamine; or mixtures thereof. In one example, the melamine derivative is hexamethoxy-methylmelamine.

The melamine derivative can be present in the rubber formulation in an amount from about 1 phr to about 10 phr. In another example, the melamine derivative is present in an amount from about 1 phr to about 5 phr.

The reinforcing filler can include calcium carbonate, clay, mica, silica and silicates, talc, titanium dioxide, starch and other organic fillers such as wood flour, carbon black, and combinations thereof. In one example, the reinforcing filler is carbon black or modified carbon black. Suitable grades of carbon black include N110 to N990, as described in RUBBER TECHNOLOGY 59-85 (1995).

The reinforcing filler can be present in the rubber formulation in an amount from about 10 phr to about 150 phr. In another example, the filler is present in an amount from about 30 phr to about 100 phr. In yet another example, the filler is present in an amount from about 40 phr to about 70 phr.

The rubber compound for the inner layer 36 may also include a phenol, such as resorcinol, a phenol-formaldehyde resin, such as resorcinol-formaldehyde resin, or mixtures thereof. In one example, the phenol can be present in the rubber formulation in an amount from about 0.1 phr to about 3 phr and, in another example, from about 0.4 phr to about 1 phr. In another example, the phenol-formaldehyde resin can be present in the rubber formulation in an amount from about 1 phr to about 5 phr and, in another example, from about 2 phr to about 4 phr.

Additional additives known in the art may also be provided in the rubber compound of the inner layer 36 to provide a desired compound having desired physical properties. Such known and commonly used additive materials are activators, retarders and accelerators, rubber processing oils, plasticizers, fatty acids, zinc oxide, waxes, antidegradant, antiozonants, and peptizing agents. The rubber compound also includes curatives or a cure system so that the composition is vulcanizable and can be prepared by standard rubber compounding methods. As known to those having ordinary skill in the art, the additives and curatives can be selected and used in conventional amounts.

The plastic compound for the inner layer 36 can include any conventional plastic compound. In one example, the plastic compound includes a flexible plastic. Suitable examples of plastics for use as the inner layer 36 include thermoplastics, such as polyurethanes, polypropylene, and the like. In one example, flexible can be defined by the following wherein a thin film, e.g., a 10 mil thick film, can be bent 180° without breaking. Additional additives known in the art may also be provided in the plastic compound of the inner layer 36 to provide a desired compound having desired physical properties. The mixing of all of the components of the plastic compound for the inner layer 36 can be accomplished by methods known to those having ordinary skill in the art.

The inner layer 36 can be prepared by calendering the material into a sheet or film material having a thickness of about 1 mm to about 10 mm. The sheet material can be cut into strips of appropriate width and length for application with a particular size or type balance pad 34. The inner layer 36 may also be coextruded with the outer layer 32 or individually extruded. When the inner layer 36 includes a plastic compound, for example, the inner layer 36 and outer layer 32 can be heat fused together. Such process involves heating both pieces simultaneously and pressing them together. The two pieces then cool together and form a permanent bond. When the inner layer 36 includes a rubber compound, for example, the inner layer 36 and outer layer 32 can be bonded directly to the outer layer 32 by conventional adhesives.

Figure 3:
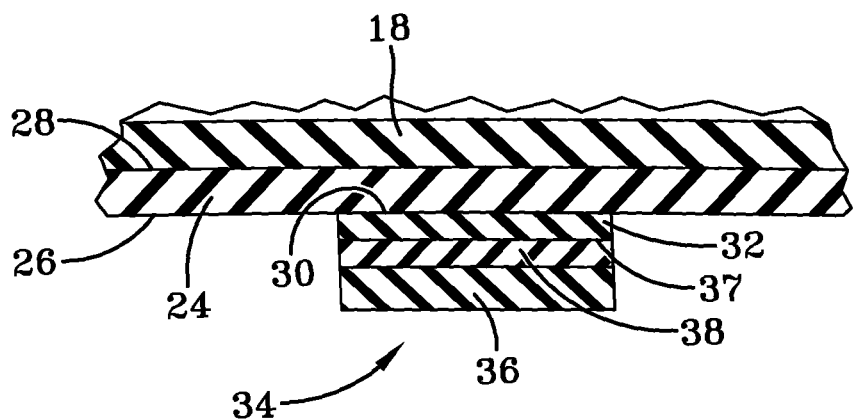
FIG. 3 is an enlarged cross-sectional view of another embodiment of a balance pad for use in balancing a pneumatic tire.

In another embodiment of the invention, as shown in FIG. 3, the balance pad 34 can further include an optional bonding layer 38 situated directly between the DVA outer layer 32 and the inner layer 36 so as to further improve adhesion therebetween.

In one example, the bonding layer 38 can include any rubber compound that desirably bonds the inner layer 36 to the outer layer 32. Suitable rubber bonding layers, also commonly referred to as tie layers, are disclosed in U.S. Patent Application Publication Nos. 2008/0314491; 2008/0314492; and 2009/015184, the contents of which are expressly incorporated by reference herein in their entireties. In one example, the rubber compound can include an epoxidized natural rubber or other polar rubbers, further optionally in combination with additional synthetic and/or natural rubbers. In one embodiment, the bonding layer 38 can include an epoxidized natural rubber and the inner layer 36 can include a rubber compound. The thickness of the rubber bonding layer 38 may be within the range from about 0.1 mm to about 2.0 mm.

The bonding layer 38 can also include an adhesive material, such as a cyanoacrylate. Examples of suitable cyanoacrylates can include alkyl cyanoacrylates, e.g., ethyl cyanoacrylate, alkoxyalkyl cyanoacrylates, e.g., alkoxyethyl cyanoacrylate, or mixtures thereof. The adhesive material also may be devoid of an epoxy resin. Specific suitable examples of the adhesive material include Loctite® 401, Loctite® 405, and Loctite® 455™, available from Henkel Corporation. Other specific examples include Permabond 820 and Permabond 737 available from Permabond. The adhesive material may be applied in any conventional manner, such as spray coating, for example. In one embodiment, the bonding layer 38 can include a cyanoacrylate and the inner layer 36 can include a plastic compound.

In another embodiment, the outer surface 28 of the innerliner 24 may further optionally include a bonding layer (not shown) so as to further improve adhesion to the ply layer 18.

Figure 4:
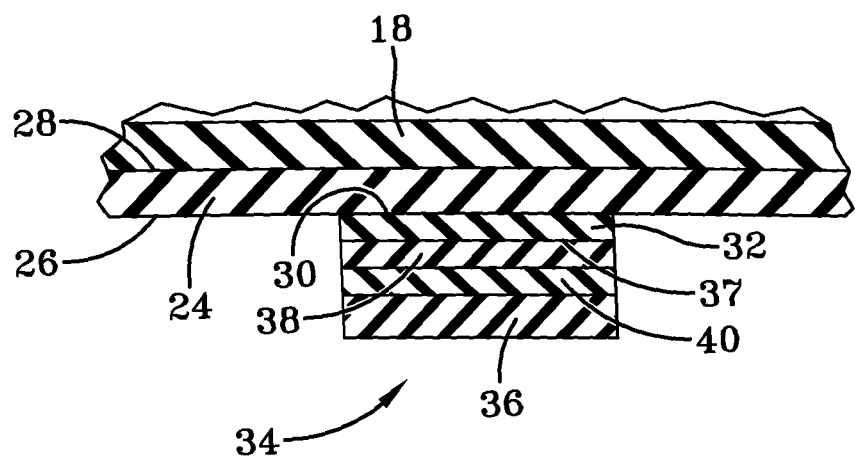
FIG. 4 is an enlarged cross-sectional view of another embodiment of a balance pad for use in balancing a pneumatic tire.

With reference now to FIG. 4, in another embodiment, the balance pad 34 can include an optional bonding gum layer 40 that is bonded to inner layer 36 and bonding layer 38, such as via an adhesive material (not shown). The rubber compound of the bonding gum layer 40 can be any curable compound known to be used in conventional bonding gum layers 40. In one example, the bonding gum layer 40 can include a rubber compound, which is devoid of an accelerator.

The adhesive material that can bond the bonding gum layer 40 to the bonding layer 38 can include an accelerator. Examples of suitable accelerators are dithiocarbamates, e.g., zinc dibutyl dithiocarbamate dibutlyamine complex. The adhesive material can also contain a suitable solvent, which can include alkanes, e.g., heptane, ketones, e.g., acetone, or mixtures thereof. In one example, the accelerator is present in the adhesive material in a range from 0.1 to 10% by weight. In another example, the accelerator is present in the adhesive material in a range from 0.1 to 5% by weight. In another example, the accelerator is present in the adhesive material in a range from 1 to 2% by weight. The adhesive material can be applied at room temperature to the bonding layer 38 and/or bonding gum layer 40 and in any conventional manner, such as spray coating. Then, the bonding layer 38 and bonding gum layer 40 are secured, such as being pressed together. The outer layer 32 is securely adhered to the inner layer 36 upon drying, or curing, of the adhesive material.

The tire carcass 16 may be any conventional type tire carcass 16 for use in pneumatic tires 10. In FIG. 1, the carcass 16 includes ply layer 18 situated adjacent the innerliner 24. The ply layer 18, which adheres the innerliner 24 to the tire carcass 16, and the remainder of the tire components, e.g., the tire tread 14, sidewalls 12, and reinforcing beads 20, generally may be selected from those conventionally known in the art. The ply layer 18, the tire tread 14, sidewalls 12, beads 20, and belts 22 and their methods of preparation are well known to those having skill in such art.

The mixing of the components of the rubber compounds for the tire layers, e.g., the ply layer 18, as well as those of the balance pad 34, e.g., the inner layer 36, can be accomplished by methods known to those having ordinary skill in the art. For example, the ingredients can be mixed in at least two stages followed by a productive mix stage. The final curatives are typically mixed in the final stage, which is conventionally called the "productive" mix stage in which the mixing typically occurs at a temperature, or ultimate temperature, lower than the vulcanization temperature of the elastomer. The terms "non-productive" and "productive" mix stages are well known to those having skill in the rubber mixing art. The rubber compounds also include curatives or a cure system so that the composition is vulcanizable and can be prepared by standard rubber compounding methods. Additives and curatives can be selected and used in conventional amounts.

Using the tire layers described above for the pneumatic tire 10, the tire 10 can be built on a tire forming drum (not shown) using standard tire building techniques. In particular, the pneumatic tire 10, as shown in FIG. 1, may be prepared by first situating or positioning the innerliner 24 on the tire drum, with the remainder of the uncured tire being subsequently built thereon. Next, the ply layer 18 is positioned directly on the innerliner 24, which is followed by the rest of the tire carcass 16 and the belts 22. As discussed above, the outer surface 28 of the innerliner 24 may optionally include an adhesive layer to provide desirable tackiness to initially adhere the innerliner 24 thereto. Finally, the rubber tire tread 14 is positioned on the belts 22 and tire carcass 16 thereby defining an unvulcanized tire assembly.

After the uncured tire assembly has been built on the drum, it can be removed and placed in a heated mold. The mold contains an inflatable tire shaping bladder that is situated within the inner circumference of the uncured tire. After the mold is closed the bladder is inflated and it shapes the tire 10 by forcing it against the inner surfaces of the closed mold during the early stages of the curing process. The heat within the bladder and mold raises the temperature of the tire 10 to vulcanization temperatures.

Generally, the tire 10 can be cured over a wide temperature range—vulcanization temperatures can be from about 100° C. to about 250° C. For example, passenger tires might be cured at a temperature ranging from about 130° C. to about 170° C. and truck tires might be cured at a temperature ranging from about 150° C. to about 180° C. Cure time may vary from about one minute to several hours. Cure time and temperature depend on many variables well known in the art, including the composition of the tire components, including the cure systems in each of the layers, the overall tire size and thickness, etc. Vulcanization of the assembled tire results in complete or substantially complete vulcanization or crosslinking of all elements or layers of the tire assembly, i.e., the innerliner 24, the carcass 16 including the ply layer 18, belts 22, and the outer tread 14 and sidewall layers 12. In addition to developing the desired strength characteristics of each layer and the overall structure, vulcanization enhances adhesion between these elements, resulting in a cured, unitary tire 10 from what were separate, multiple layers.

The thin, lightweight DVA innerliner 24, which includes a dynamically vulcanized alloy, exhibits desirably low permeability properties. The resulting overall structure allows for a tire construction having reduced weight.

After the tire 10 has been cured, the outer layer 32 of one or more balance pads 34 can be bonded to the innerliner 24 via an adhesive material so as to eliminate or reduce the effects of imbalance in the formed tire 10. In particular, the inner surface 26 of the innerliner 24 is prepared prior to adhering the outer layer 32 of the balance pad 34 thereto. In one example, the innerliner 24 is cleaned with a solvent. Thereafter, adhesive material, e.g., a cyanoacrylate, can be applied to the outer surface 30 of the outer layer 32 of the balance pad 34 and/or the inner surface 26 of the innerliner 24 at room temperature and in any conventional manner, such as spray coating, for example. Then, the outer layer 32 of the balance pad 34 is secured to the innerliner 24 such as by being pressed thereagainst. Examples of suitable cyanoacrylates can include alkyl cyanoacrylates, e.g., ethyl cyanoacrylate, alkoxyalkyl cyanoacrylates, e.g., alkoxyethyl cyanoacrylate, or mixtures thereof. The adhesive material also may be devoid of an epoxy resin. Specific suitable examples of the adhesive material include Loctite® 401, Loctite® 405, and Loctite® 455™, available from Henkel Corporation. Other specific examples include Permabond 820 and Permabond 737 available from Permabond. The adhesive material may be applied in any conventional manner. The balance pad 34, which may be of any desired shape or size, is securely adhered to the innerliner 24 upon drying, or curing, of the adhesive material. The outer layer 32 of the balance pad 34 also can be be heat fused to the innerliner 24.

A non-limiting example of a rubber formulation for use in the inner layer 36 in accordance with the detailed description is disclosed below. The example is merely for the purpose of illustration and is not to be regarded as limiting the scope of the invention or the manner in which it can be practiced. Other examples will be appreciated by a person having ordinary skill in the art.

TABLE I

Inner Layer Rubber Formulation

| Component | Stage | Amount (phr) |
| --- | --- | --- |
| Synthetic polyisoprene | Non-productive 1 (NP1) | 15 |
| Natural rubber | NP1 | 85 |
| Carbon Black | NP1 | 40 |
| Fatty Acid, plasticizer | NP1 | 0.5 |
| Oil | NP1 | 3.0 |
| Zinc Oxide | NP1 | 5.0 |
| NP1 | Non-Productive 2 (NP2) | 148.5 |
| Phenol Formaldehyde Resin | NP2 | 2.0 |
| Resorcinol | NP2 | 0.6 |
| Polymerized 1,2-dihydroxy-2,2,4 trimethyl Quinoline, antioxidant[2] | NP2 | 1.0 |
| Oil | NP2 | 1.0 |
| Fine Size Hydrated Silica | NP2 | 10 |
| NP2 | Non-Productive 3 (NP3) | 163.1 |
| NP3 | Productive | 163.1 |
| HMMM[1] | Productive | 2.78 |
| N-cyclohexyl-2-benzothiazole sulfonamide | Productive | 0.36 |
| Insoluble sulfur | Productive | 2.9 |
| Zinc Oxide | Productive | 1.0 |
| Diphenyl Guanidine, accelerator | Productive | 0.13 |
| Benzothiazyl disulfide, accelerator | Productive | 0.54 |
| Total | | 170.81 |

[1]Hexamethoxymethylmelamine, on a free flowing silica carrier at 72% activity

The inner layer rubber formulation of Table 1 was compared to a Control and a Comparative Example, both of which are discussed next.

The Control Formulation

This rubber formulation was identical to the rubber formulation of Table I, except that HMMM was excluded from the formulation to give a total phr of 168.03.

Comparative Example

This rubber formulation was identical to the rubber formulation of Table I, except that the HMMM was replaced with 3.0 phr hexamethylene bis-thiosulfate disodium salt dihydrate to give a total phr of 171.03.

The rubber formulations identified above were prepared by standard rubber compounding methods known to those having ordinary skill, and as previously discussed above. Each prepared formulation was further processed via standard methods to provide a ply layer suitable for use in a tire build.

Various characteristics and properties of each inner layer, including cured adhesion to a 0.2 mm DVA layer, was evaluated. The DVA film was Exxcore™ DVA film, which was obtained from ExxonMobil of Houston, Tex. This DVA layer included nylon as the continuous phase and at least a partially vulcanized brominated isobutylene p-methylstyrene copolymer as a dispersed phase.

For testing purposes, each inner layer was situated directly adjacent a surface of the DVA film, i.e., there was no bonding layer or adhesive material therebetween, and cured at 150° C. for 23 minutes at 100 psi. Then, a 1 inch strip was cut out in the grain direction and the steady state average load at a crosshead speed of 50.8 cm/min was determined using an Instron. Three samples were tested for each rubber formulation. The results/data are set out in Table II below.

TABLE II

Test Results

| Testing | Units | Control | Table I formulation | Comparative Example |
|---|---|---|---|---|
| Cured Adhesion at room temperature | Avg. Force (lbs/inch) | 5.3 | 17.9 | 3.9 |

Based upon the test results, the inner layer rubber formulation for the Comparative Example, which included the hexamethylene bis-thiosulfate disodium salt dehydrate, did not improve cured adhesion to the DVA barrier layer. However, the ply layer rubber formulation of Table 1, which included the HMMM, unexpectedly significantly enhanced cured adhesion between the inner layer and DVA barrier layer.

Different adhesive materials were also tested to determine their effectiveness in securing DVA film, such as for use as innerliner 24, to DVA film, such as for use as outer layer 32 of balance pad 34, in accordance with the detailed description.

The DVA film for use in the testing was Exxcore™, which is available from ExxonMobil of Houston, Tex. This DVA barrier layer included nylon as the continuous phase and at least a partially vulcanized brominated isobutylene p-methylstyrene copolymer as a dispersed phase. Each DVA film had one surface provided with a rubber bonding layer, also referred to as a tie layer (also known as Exxcore™ DVA), which included an epoxidized natural rubber.

In other examples further below, adhesive materials were tested to determine their effectiveness in securing a DVA film, such as for use as outer layer 32, to bonding gum layer 40 in accordance with the detailed description. Situated intermediate the DVA outer layer 32 and the bonding gum layer 40 was rubber bonding layer 38, which was adhered to the outer layer 32. The bonding gum layer 40 was part of a conventional two-layer balance pad, which also included outer layer 36 and was available from Patch Rubber Company. Adhesion strength between the adhered layers was evaluated and discussed below.

The examples below are merely for the purpose of illustration and are not to be regarded as limiting the scope of the invention or the manner in which it can be practiced. Other examples will be appreciated by a person having ordinary skill in the art.

Adhesion of DVA Film to DVA Film

Three different exemplary commercial adhesives from Henkel Corporation, which included cyanoacrylates, and two comparative adhesives from Patch Rubber Company and Tech International, respectively, were individually applied to a 4×6 inch area of the non-tie layer side of five separate 14 mil cast DVA films (6×6 inch). Another cast DVA film was pressed against each of the five coated DVA films so as to sandwich the adhesive material therebetween. The adhesive material was allowed to solidify. Three 1" strips were cut out from each test piece, followed by Instron pull at a cross head speed of 50.8 cm/min at room temperature. The adhesives and average results/data are set out in Table I below.

TABLE I

Adhesive Materials and Test Results

| Adhesive | Supplier | RT peel (N/inch) |
|---|---|---|
| Loctite ® 401[1] | Henkel Corporation | 47.8+ |
| Loctite ® 409[2] | Henkel Corporation | 51.9+ |
| Loctite ® 455[3] | Henkel Corporation | 36.02+ |
| Fast Dry Cement[4] | Patch Rubber Company | 0.5 |
| Fast Dry Cement[5] | Tech International | 0.3 |

[1] Ethyl cyanoacrylate
[2] Ethyl cyanoacrylate
[3] Alkoxyethyl cyanoacrylate
[4] Zinc dibutyl dithiocarbamate dibutlyamine complex
[5] Zinc dibutyl dithiocarbamate dibutlyamine complex The test pieces employing the cyanoacrylate adhesive material exhibited significantly stronger bonds than the two comparative test pieces. Indeed, none of the three test pieces using the cyanoacrylate adhesive material could be peeled, i.e., each broke at jaw, at room temperature, and the comparative test pieces exhibited negligible adhesion.

Adhesion of DVA Film with Bonding Layer to Bonding Gum Layer of Balance Pad

A fast dry adhesive material available from the Patch Rubber Company was applied to the bonding layer of one 10 mil cast DVA film. The bonding gum layer of a conventional 2 oz. 2-layer balance pad, which was available from Patch Rubber Company, was pressed against the DVA film so as to sandwich the fast dry adhesive material therebetween. The adhesive material was then allowed to dry. After one week, a pull force was determined at a cross head speed of 50.8 cm/min at room temperature and at 95° C. The adhesive material and results/data are set out in Table II below.

TABLE II

Adhesive Material and Test Results

| Adhesive | Supplier | RT peel (N/inch) | 95° C. peel (N/inch) |
|---|---|---|---|
| Fast Dry Cement[1] | Patch Rubber Company | 51.8+ | 9.1+ |

[1]Zinc dibutyl dithiocarbamate dibutlyamine complex

The test results showed, as with the DVA to DVA test results, that the DVA film adhered well to the bonding gum layer via the tested adhesive material.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. A pneumatic tire comprising:
    an outer tread;
    an innerliner disposed inwardly of the outer tread and including a first dynamically vulcanized alloy, which comprises an engineering resin as a continuous phase and at least a partially vulcanized rubber as a dispersed phase, the innerliner further including an inner surface and an outer surface; and
    a balance pad consisting of a multilayered structure and defining a patch of material having a sufficient mass that counteracts an imbalance in the pneumatic tire, the multilayered structure comprising an outer layer that consists of a second dynamically vulcanized alloy, which comprises an engineering resin selected from nylon as a continuous phase and at least a partially vulcanized rubber selected from a halogenated isobutylene containing rubber as a dispersed phase, and an inner layer including a rubber or plastic compound that is bonded to the outer layer,
    wherein a confronting surface of the outer layer is bonded directly to and along a confronting surface of the inner layer thereby defining separate layers of the multilayered structure,
    wherein the total amount of the nylon and halogenated isobutylene containing rubber is not less than 30% by weight, based on the total weight of the second dynamically vulcanized alloy, and
    wherein the outer layer of the balance pad is bonded to the inner surface of the innerliner via an adhesive material including a cyanoacrylate at a position that offsets the imbalance in the pneumatic tire that existed prior to bonding the balance pad.

2. The tire of claim 1 wherein the cyanoacrylate is selected from an alkyl cyanoacrylate and/or an alkoxyalkyl cyanoacrylate.

3. The tire of claim 1 wherein the engineering resin is a polyamide and the at least partially vulcanized rubber is a halogenated rubber for the first dynamically vulcanized alloy.

4. The tire of claim 1, wherein the balance pad has a width less than half the width of the outer tread.

5. The tire of claim 1 wherein the halogenated isobutylene containing rubber is brominated isobutylene p-methylstyrene copolymer.

6. The tire of claim 1 wherein the nylon is selected from Nylon 6, Nylon 66, Nylon 6 66 copolymer, Nylon 11, and Nylon 12, or blends thereof.

7. The tire of claim 1 wherein the halogenated isobutylene containing rubber is brominated isobutylene p-methylstyrene copolymer and the nylon is selected from Nylon 6, Nylon 66, Nylon 6 66 copolymer, Nylon 11, and Nylon 12, or blends thereof.

8. A method of balancing a pneumatic tire comprising:
    determining an amount and a location of an imbalance in the pneumatic tire; and
    bonding an outer layer of at least one balance pad consisting of a multilayered structure to an inner surface of an innerliner of the pneumatic tire via an adhesive material including a cyanoacrylate at a desired location that offsets the imbalance in the pneumatic tire, the innerliner disposed inwardly of an outer tread and including a first dynamically vulcanized alloy, which comprises an engineering resin as a continuous phase and at least a partially vulcanized rubber as a dispersed phase, the outer layer consisting of a second dynamically vulcanized alloy, which comprises an engineering resin selected from nylon as a continuous phase and at least a partially vulcanized rubber selected from a halogenated isobutylene containing rubber as a dispersed phase, wherein the total amount of the nylon and halogenated isobutylene containing rubber is not less than 30% by weight, based on the total weight of the second dynamically vulcanized alloy, the multilayered structure further comprising an inner layer including a rubber or plastic compound that is bonded to the outer layer, wherein the balance pad defines a patch of material, which has a sufficient mass to counteract the imbalance in the pneumatic tire, and wherein a confronting surface of the outer layer is bonded directly to and along a confronting surface of the inner layer defining separate layers of the multilayered structure of the balance pad.

9. The method of claim 8 further comprising bonding additional balance pads to the inner surface of the innerliner of the tire.

10. The method of claim 8, wherein the balance pad has a width less than half the width of the outer tread.

11. The method of claim 8 wherein the halogenated isobutylene containing rubber is brominated isobutylene p-methylstyrene copolymer.

12. The method of claim 8 wherein the nylon is selected from Nylon 6, Nylon 66, Nylon 6 66 copolymer, Nylon 11, and Nylon 12, or blends thereof.

13. The method of claim 8 wherein the halogenated isobutylene containing rubber is brominated isobutylene p-methylstyrene copolymer and the nylon is selected from Nylon 6, Nylon 66, Nylon 6 66 copolymer, Nylon 11, and Nylon 12, or blends thereof.

* * * * *

UNITED STATES PATENT AND TRADEMARK OFFICE
CERTIFICATE OF CORRECTION

PATENT NO. : 10,081,221 B2
APPLICATION NO. : 12/953909
DATED : September 25, 2018
INVENTOR(S) : Ramendra Nath Majumdar et al.

Page 1 of 1

It is certified that error appears in the above-identified patent and that said Letters Patent is hereby corrected as shown below:

In the Specification

Column 3, Line 21, change "("OVA")" to --("DVA")--.

Signed and Sealed this
Eighth Day of January, 2019

Andrei Iancu
*Director of the United States Patent and Trademark Office*